(12) United States Patent
Berrey

(10) Patent No.: US 9,145,094 B2
(45) Date of Patent: Sep. 29, 2015

(54) VEHICLE ROOF TOP BOAT STORAGE UNIT

(76) Inventor: Howard Berrey, Punta Gorda, FL (US)

( * ) Notice: Subject to any disclaimer, the term of this patent is extended or adjusted under 35 U.S.C. 154(b) by 0 days.

(21) Appl. No.: 13/809,150

(22) PCT Filed: Feb. 22, 2012

(86) PCT No.: PCT/US2012/026164
§ 371 (c)(1),
(2), (4) Date: Jan. 8, 2013

(87) PCT Pub. No.: WO2012/116093
PCT Pub. Date: Aug. 30, 2012

(65) Prior Publication Data
US 2013/0105535 A1    May 2, 2013

Related U.S. Application Data

(60) Provisional application No. 61/445,770, filed on Feb. 23, 2011.

(51) Int. Cl.
| *B60R 9/04* | (2006.01) |
| *B60R 9/055* | (2006.01) |
| *B60P 3/10* | (2006.01) |
| *B63B 35/71* | (2006.01) |
| *B63B 35/73* | (2006.01) |

(52) U.S. Cl.
CPC .............. *B60R 9/055* (2013.01); *B60P 3/1008* (2013.01); *B63B 35/71* (2013.01); *B63B 35/73* (2013.01)

(58) Field of Classification Search
CPC ....... B60P 3/1008; B60R 9/055; B63B 35/73; B63B 35/71

USPC ......... 224/328, 315, 309, 319, 321, 324, 486, 224/406; 114/361
See application file for complete search history.

(56) References Cited

U.S. PATENT DOCUMENTS

| 3,301,449 | A | * | 1/1967 | Tope | 224/487 |
| 3,685,061 | A | * | 8/1972 | Wray | 5/119 |
| 4,036,520 | A | * | 7/1977 | Zuidema | 296/157 |
| 4,173,965 | A | | 11/1979 | Vallee | |
| 4,289,348 | A | * | 9/1981 | Greene | 296/157 |
| 4,522,145 | A | * | 6/1985 | Stone | 114/352 |
| 4,790,256 | A | | 12/1988 | Levine | |
| 4,800,832 | A | | 1/1989 | Sulimierski | |
| 5,050,526 | A | | 9/1991 | Nelson | |
| 5,261,346 | A | * | 11/1993 | Updyke | 114/352 |
| 5,396,861 | A | | 3/1995 | Acker | |
| 5,645,010 | A | | 7/1997 | Lundstrom | |
| 6,234,371 | B1 | * | 5/2001 | Sinn | 224/328 |
| 7,416,098 | B2 | | 8/2008 | Settelmayer | |
| 7,465,207 | B2 | | 12/2008 | Whitney | |
| 2007/0205240 | A1 | * | 9/2007 | Castro et al. | 224/328 |
| 2010/0037812 | A1 | | 2/2010 | Sahr | |

* cited by examiner

*Primary Examiner* — Adam Waggenspack
*Assistant Examiner* — Matthew Theis
(74) *Attorney, Agent, or Firm* — Porter Wright Morris & Arthur, LLP

(57) ABSTRACT

A storage device attachable to a vehicle roof rack having a removable boat. The storage device comprises a base with a container. The boat is securely releasably attached in an inverted position to cover the container. A shape of the base conforms to a gunwale of the boat. The base has a flange and rim to engage a first side gunwale when the other side of the boat is lifted from the storage device. The boat is securely fastened to the base, such that the boat fits completely over the container to create a water-tight volume from the container base to the inside bottom of the boat. When the boat is released, securing means remain attached to the storage device, and the boat is easily lifted off of the storage device.

14 Claims, 11 Drawing Sheets

VEHICLE ROOF TOP BOAT STORAGE UNIT

CROSS-REFERENCES TO RELATED APPLICATIONS

This patent application claims the benefit of US provisional patent application Ser. No. 61/445,770 filed Feb. 23, 2011, hereby incorporated by reference.

TECHNICAL FIELD

The present invention relates generally to roof-top vehicle carriers and specifically to a carrier that includes a secure storage space and a detachable boat.

BACKGROUND OF THE INVENTION

Although many travelers and sports enthusiast carry boats on trailers or inside a vehicle, such as an SUV, car, RV, truck and the like, many simply tie the boat to the roof of the vehicle. Problems arise when carrying a boat on the roof of a vehicle. The boat may shift in transit and damage the vehicle exterior or come off completely and damage another vehicle on the road. Certain boats, such as those made of wood and other materials, are heavy and difficult to lift on and off the vehicle roof. Other boats are wider or longer than the vehicle roof top and may tip if not secured to the bumpers of the vehicle. Ropes or straps used to secure the boat to the bumpers obscure the vision of the driver. When a boat is stored inside the vehicle, space for passengers and storage space for equipment and gear are reduced or eliminated.

There are a number of existing ways to carry a boat on a vehicle roof. Simple, heavy duty bars and racks are standard on, or may be added to many sports vehicles to aid in carrying equipment and gear. Tying the boat to existing racks, while simple, is time consuming, and may not be adequate to prevent the boat from slipping—or the ropes may become untied and cause the boat to fly off the roof with tragic results in traffic.

Thule AB (Murmansgatan 126, 212 25 Malmö, Sweden) and Yakima Products, Inc. (15025 SW Koll Pkwy., Beaverton, Oreg. 97006-6056) make roof rack systems for most cars, trucks, vans, SUVs and RVs to transport boats and kayaks. These systems typically comprise horizontal bars that extend the width of the vehicle with padded supports that cradle a boat or kayak on the vehicle roof rack. While providing better attachment, these systems have drawbacks. Loading and unloading a boat from a vehicle using these systems is difficult and typically takes two people. If the boat is attached to a base along a side, hinges are typically used. Engaging and disengaging the hinges is difficult and requires a ladder in larger profile vehicles. Kayaks present additional problems. Kayak users sometimes cinch tie lines too tightly, which can cause hull damage to the kayak.

Thule AB makes cargo boxes that attach to existing roof racks. Thule® cargo boxes are durable, side opening storage containers that are about 87"L×36"W×15"H. However, no storage space is typically included with boat or kayak rack systems for vehicles.

A need exists for an economical and cost-efficient lightweight boat sized to fit the roof-top of a vehicle that is securely fasted to the vehicle, but can be removed easily by one person. Combining such a boat with the ability to securely and safely store equipment and gear under the boat would be useful to travelers.

DISCLOSURE OF THE INVENTION

The present invention is directed to a boat and storage container attachable to existing roof racks on a vehicle. In an embodiment, the invention comprises a boat that fits atop and is securely attachably detachable to a roof top storage container such that the bow of the boat is toward the front of the vehicle roof and the boat/container creates an aerodynamic storage space.

The present invention is a storage device attachable to a vehicle roof rack that has a removable, relatively small, lightweight boat that serves as a waterproof durable cover. The storage device comprises a container, means for releasably attaching the container to the roof rack, and means for securely releasably attaching the boat in an inverted position to the container. The storage device comprises a base and at least two side walls that form the container. The walls may be attached to each other at a bow end. The storage device is oriented with the bow end of the boat and the container toward the front of the vehicle. The container is an open container that has a shape that generally conforms to the interior of the boat. In an embodiment, the container is shaped to receive a kayak. In this embodiment, the container shape conforms to the open area of the kayak.

The storage device has a substantially flat base that is proximate to the vehicle and substantially shaped like the top outline of the boat. The base of the storage device may be flat or may follow the contour of the gunwale of the boat. The base is attached to the racks (usually 2) of the vehicle by any releasably attachable means. In an embodiment, the storage device is attached to the racks by a clamp with a releasable toggle.

All or a portion of the base may be covered by a pad. The pad is made from any material that prevents or decreases objects placed in or on the container from sliding when the vehicle is in motion. The pad may (or may include means to) keep air, water, insects and the like out of the container. The pad comprises means to tie down objects placed in the container. Tie are any restraining device, such as but not limited to hooks, cords, netting, hook and loop fasteners, indentations, and the like. In an embodiment, the indentations are shaped to receive objects to prevent them from moving, such as parts for the boat (engine, motor, battery, seats, etc), accessories for the boat (oars, nets, bumpers, ropes, etc) sporting equipment (fishing gear, etc), and camping gear (cook stove, tent, sleeping bag, food, clothing, etc).

The storage device walls are attached to the base and conform generally to the interior walls of the boat. The invention comprises at least one bench to provide seating in the boat during use. The boat part comprises a mount 300 for a motor or engine.

In an embodiment, the storage device comprises a flange that extends outward from the walls that form the container. The flange comprises a rim. A gunwale of the boat rests on the flange. The rim extends along each side of the base to act as a hinge to engage the gunwale when an opposite side of the boat is angle lifted from the base. An advantage of the invention is that the rim engages the gunwale of the boat, thus eliminating any requirement for additional hardware and allowing the boat to be easily and quickly removed from the storage device.

The boat is attached to the storage device by securing means. The securing means is any device that easily releasably attaches the boat to the storage device. Any fastener, such as but not limited to cam handles, a locking hasp, interlocking plates, retaining nuts and collars, pins, anchors, lock bushings, padlocks, ropes and the like may be used to secure the boat to the storage device.

The securing means comprises locking mechanisms, which work to attach the boat to the container. The securing means are located so an adult can easily access to detach the boat. In an embodiment, the securing means are located on a portion of the side wall of the boat. The locking mechanisms typically extend though the wall of the gunwale of the boat and locks to a portion of the corresponding side wall of the storage device. The locking mechanism is placed so that the boat fits over the container to create a water-tight volume from the container base to the inside bottom of the boat. When all locks are opened, the boat is released, the securing means remains attached to the storage device, and the boat may be lifted off of the container. Securing means may also be employed in corresponding openings in the boat and container through which a rope, a detachable pad lock, and the like are inserted to secure the boat to the container. In an embodiment, the boat comprises exterior surface elements on each exterior side of the boat to assist in removing the boat from the container. In an embodiment, two locking mechanisms are located apart from each other on each side of the device.

In an embodiment, the locking mechanisms may comprise a hinge. The hinge allows the boat to angle away from the container when one side is unlocked and the other side is attached. A user can then access items stored in the container, and relock the boat to the container. An arm props the opened side of the device open when unlocked. The walls of the container comprise access means, including but not limited to a segment of the side wall that is lower than the remainder of the wall, a door, a sliding panel, a removable segment, a hinged segment, and the like. The access portion is an opening that allows a user to see into or place objects in the container without reaching over the top of the wall.

In an embodiment used for kayaks and canoes, the side walls of the container are joined at a bow end and a stern end. In an alternate embodiment, the storage device comprises a stern wall. In this embodiment, the side walls are not directly attached, but are attached to opposite ends of the stern wall. The back wall extends upward from the edge of the base that is toward the back of the vehicle roof and generally conforms to the inside of the stern of the boat. Each storage device side wall is joined to an upward extending opposite lateral side of the back wall.

In an embodiment, a container cover is used when the boat is removed from the storage device. The cover protects items in the container when the boat is removed from theft and the elements. The cover is formed from a tear-resistant, waterproof or water resistant flexible material shaped or fitted to securely cover the container when the boat is removed.

The storage device is formed from any lightweight durable material, such as polymers, rubbers, metals, composites thereof, or any other suitable heat resistant material that is generally resistant to breakage. The container is open at the top of the side and back walls, and the container walls do not extend to the floor of the boat. The storage device may be formed with structures to increase durability, such as, but not limited to, honeycomb structures, indentations, struts, ribs and the like.

The volume of the container is less than the volume of the interior of the boat and may be loaded with items such as clothing, personal items, equipment and gear. The interior of the container is not segmented, thus offering the advantage that objects may be carried that extend the entire length of the container. Because the container is lidless, objects that extend over the top edge of the container that fit within the boat may be transported when the boat is attached, and objects larger than those that fit within the boat may be carried if the boat is not attached. With the boat attached, the container is water tight and secure. When the vehicle is driven without the boat on the storage device, the container is aerodynamic.

The boat of the present invention fits over the container and is securely detachably attached to the storage device. An important advantage of the present invention is that, because the boat fits over the container, the boat gunwale does not have to be a straight plane. The boat is formed from any lightweight, rigid, durable material, such as metals, polymers, fiberglass, resins, compounds and composites thereof, and the like. The boat may be motor or engine driven and includes means to mount an engine or motor. Being formed and manufactured from lightweight, rigid, and durable materials provides additional advantages, such as the boat being easier to remove and easier to attach than other vehicle top boats.

The boat of the present invention is formed with additional elements, such as handles or an exterior surface element to make it easy to lift the boat off of the container, seating and the like. The handles may be used to attach bumpers or other gear to the outside of the boat. Seating for the boat or kayak is included. The handles and benches/seats are formed from a similar material as that used to make the boat, or from any lightweight durable material. The handles may be openings that correspond to openings in the storage device and are use to secure the boat to the storage device using a padlock, a rope, a tie, and the like.

The storage device and boat may be used without the vehicle to securely store gear and equipment, such as in the off season or when using the vehicle for other purposes.

As used herein, the word "boat" includes kayaks, sailboats, canoes, paddleboats, skiffs, dories, dinghies, yachts, and any other similar water vessel.

As used herein, "approximately" means within plus or minus 25% of the term it qualifies. The term "about" means between ½ and 2 times the term it qualifies.

The compositions and methods of the present invention can comprise, consist of, or consist essentially of the essential elements and limitations of the invention described herein, as well as any additional or optional ingredients, components, or limitations described herein or otherwise useful in compositions and methods of the general type as described herein.

Numerical ranges as used herein are intended to include every number and subset of numbers contained within that range, whether specifically disclosed or not. Further, these numerical ranges should be construed as providing support for a claim directed to any number or subset of numbers in that range or to be limited to the exact conversion to a different measuring system, such, but not limited to, as between inches and millimeters.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

Terms such as "top," "bottom," "right," "left," "above", "under", "side" "front" and "back" and the like, are words of convenience and are not to be construed as limiting.

DETAILED DESCRIPTION OF THE INVENTION

Reference will now be made in detail to the exemplary embodiments of the invention, examples of which are illustrated in the accompanying drawings. In accordance with an embodiment of the present invention, a storage device attachable to a vehicle roof rack includes a removable boat. The storage device comprises a base with a container. The boat is securely releasably attached in an inverted position to cover the container. A shape of the base conforms to a gunwale of the boat. The base has a flange and rim to engage a first side gunwale when the other side of the boat is lifted from the storage device. The boat is securely fastened to the base, such that the boat fits completely over the container to create a water-tight volume from the container base to the inside bottom of the boat. When the boat is released, securing means remain attached to the storage device, and the boat is easily lifted off of the storage device.

Figure 1:
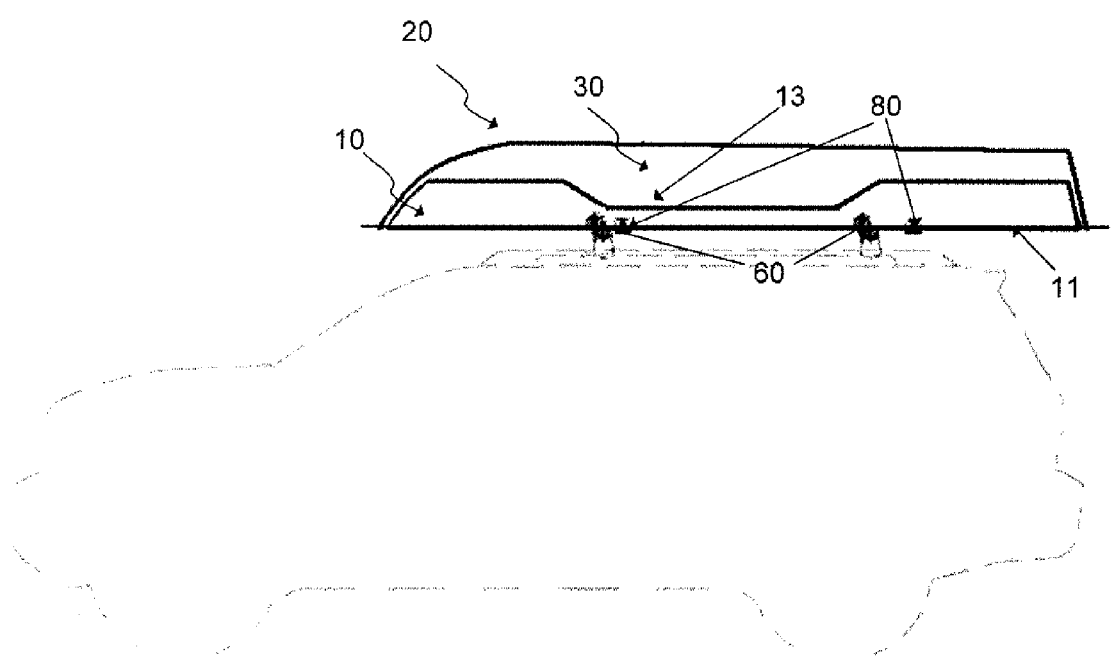
FIG. 1 is a side see-through view of an embodiment of the boat, secured to the container attached to a rack of a typical vehicle.

As shown in an embodiment depicted in FIG. 1, the invention comprises a storage part 10 and a boat part 20. Together, the storage part 10 and the boat part 20 create a secure, water-tight vehicle roof-top storage volume or container 30 with the storage part 10 providing support for the removable boat part 20. Although the figures depict boat and kayak examples of the invention, the boat part 20 may be a sailboat, canoe, paddleboat, skiff, dory, dingy, yacht, or any other similar water vessel.

Figure 2:
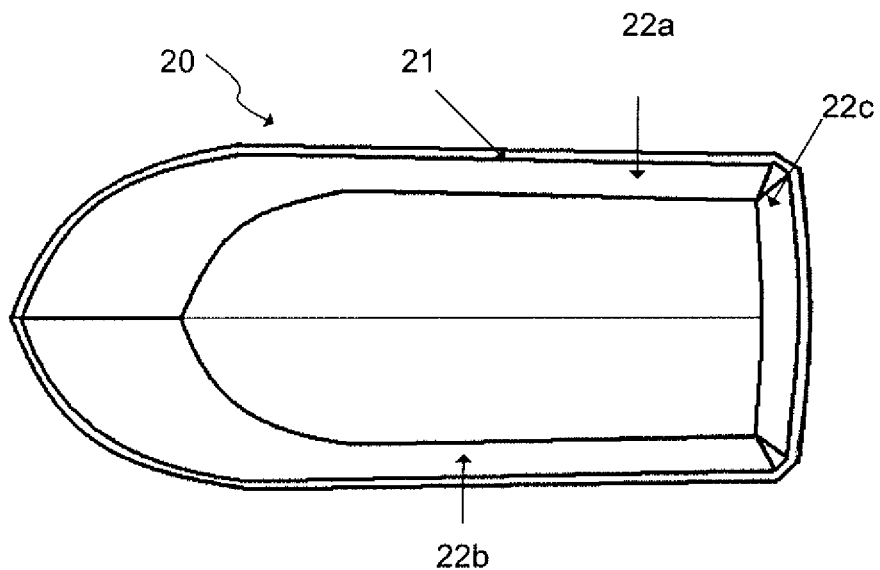
FIG. 2 is a top view of an embodiment showing the interior of the boat.

The storage part 10 has a shape that conforms to the boat part 20. The storage part 10 has a substantially flat base 11 that is proximate to the vehicle and similar in overall dimensions to the outline of the gunwale 21 of the boat sides 22a, 22b, 22c (see FIG. 2). The base 11 is easily attached to roof racks conventionally used on vehicles by any releasably attachable means.

Figure 3:
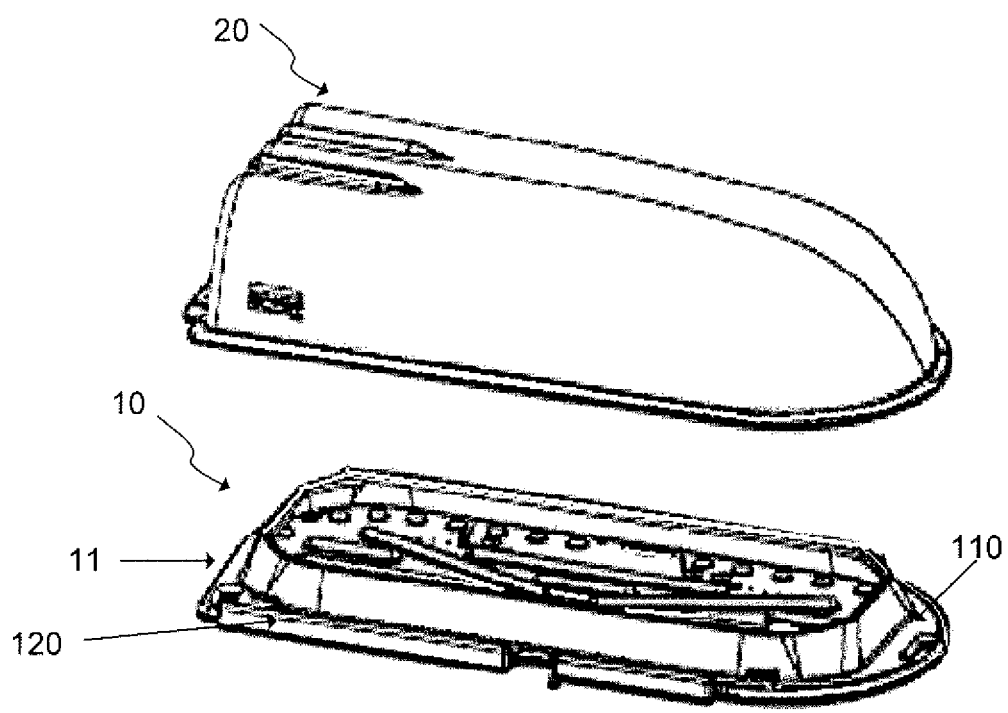
FIG. 3 is a perspective blow-out view of the boat and the storage part.

As shown in FIG. 3, the base 11 may include a flange 110. The gunwale 21 of the boat 20 rests against the flange 110. The flange and the boat may comprise corresponding openings to attach a securing means. The flange 110 may include a rim 120. In an embodiment, the rim acts to hold the gunwale 21 of the boat to act as a hinge. The flange may include a weather strip or similar device to seal the contents of the container.

Figure 4:
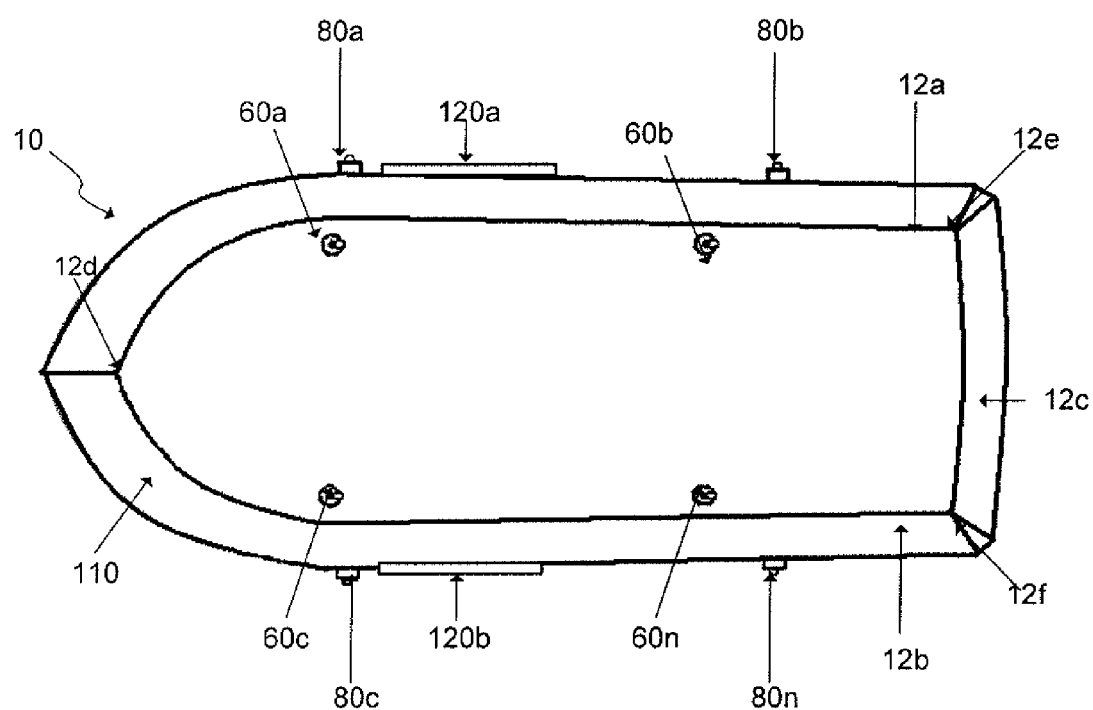
FIG. 4 is a top view of an embodiment of the container showing attachment means to the racks and the secure attachments for the boat.
Figure 7:
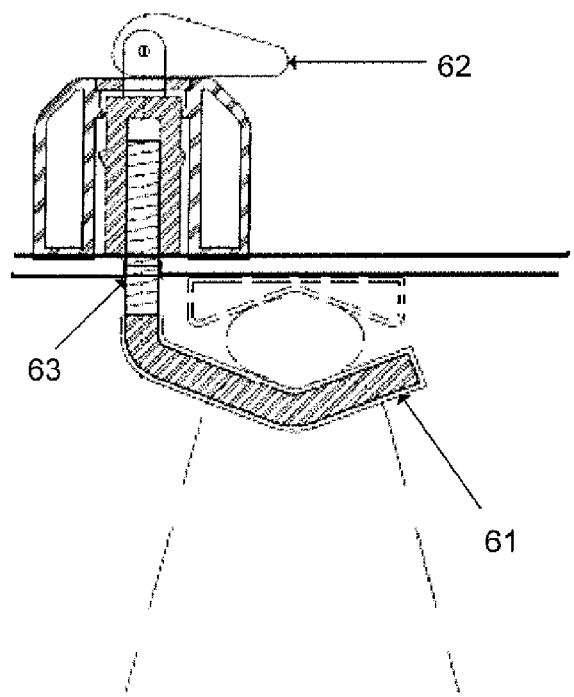
FIG. 7 is cut away view of an embodiment of the attachment means.
Figure 8:
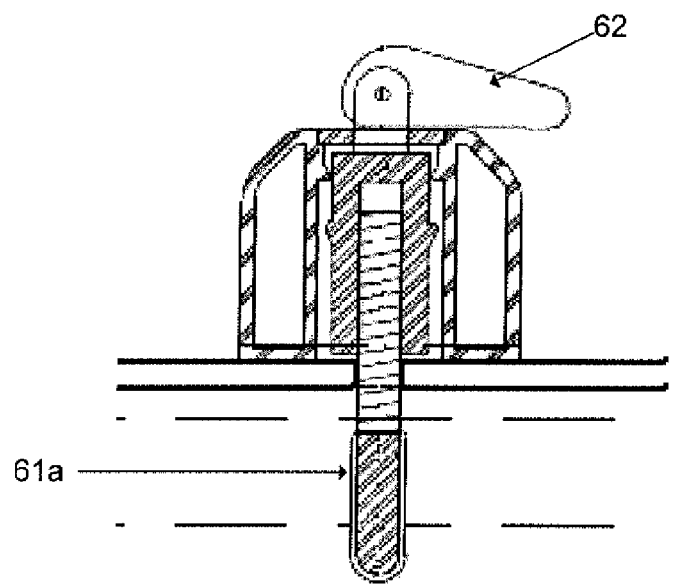
FIG. 8 is side cut away view of an alternate embodiment of the attachment means.

In an embodiment depicted in FIG. 4, the base 11 is attached to the racks by at least one attachment means 60, a,b,c,n. The attachment means is formed from any strong, durable material that withstands torque and mechanical movement, such as a plastic, a metal and combinations and composites thereof. In an embodiment, the attachment means 60 is formed from a metal and coated with a plastic. The attachment means is any releasably fastener, such as but not limited to a bracket, a bolt, a strap, and the like. In an embodiment, the attachment means is a clamp 61 that holds the container to the rack with a releasable toggle 62 (See FIG. 7). In an embodiment, the clamp is a bolt 61a that extends through the rack (see FIG. 8). The base of the container comprises openings 63 to allow the toggle 61 to mate with the bolt or clamp. As depicted in the Figures, a portion of the attachment means 60 extend into the container interior from the base. The attachment means portion on the interior of the container may be covered or exposed. To attach the container to the vehicle, the clamp or bolt is attached to the rack and the openings 63 in the base are lowered on top, such that the toggle portion aligns with the clamp or bolt portion. As shown in FIG. 4, multiple attachment means 60 a-n may be used to attach the container to the vehicle rack. The attachment means 60 are placed at any point in the base that provides stable attachment and easy detachment from the racks. In an embodiment, four attachments means are used to attach the device to two roof racks at two separate points.

Referring to FIG. 4, the container comprises at least two opposite side walls, 12a, 12b. The side walls extend upward from opposite sides of the base. The side walls curve inward, conforming to the inside of the sides of the boat and are joined to each other at a front (or bow end) of the base 12d. In an embodiment for a kayak, the second end of each of the sides are joined at a stern end (see FIG. 16). In an embodiment, the container further comprises a back wall 12c (FIG. 4). The joints may be sharp or rounded, provided that they allow a corresponding water vehicle to fit over the container. The side walls may be inwardly tapered or may have angled segments 12 h, and may include facets 12 e,f to conform to the shape of the boat. The back wall extends upward from a stern edge of the base that is toward the back of the vehicle roof and conforms to the inside of the stern of the boat. Each stern end of the side walls is joined to an edge of the back wall. In an embodiment, the container comprises an extension that extends from the bottom of the exterior of the container walls and accepts the top of the sides of the boat. In an embodiment, the extension comprises at least one flange on each side of the storage device. The flanges comprise a rim that extends at an angle from the flange to cup the gunwale of the boat.

The storage part is formed from polymers, rubbers, metals, composites thereof, or any other suitable material that is generally resistant to heat and breakage. The walls may be solid or hollow or honeycomb. In an embodiment, the storage part is constructed of molded plastic having a thickness of at least 3 mm. One skilled in the art would understand that any thickness to provide rigidity and support yet be lightweight is included in the invention. In an embodiment, the side and back walls are formed in a single unit. In an embodiment, the base and the walls are formed in a single unit. In an embodiment, the storage part is open at the top of the side and back walls. The walls of the container do not extend to the bottom of the boat.

The side walls, 12a, 12b, of the storage part comprise access means 13. In an embodiment, the access means 13 is a segment of the side wall that is lower than the remainder of the wall. The access means provides access to contents in the container without lifting over the top edge of the wall, and also allow a user to view objects in the container.

Alternatively, the access means 13 of the storage part comprises access doors, such as a sliding panel, a removable segment, or a hinged segment. Access doors may be hinged, sliding, attachably detachable, and the like.

Figure 5:
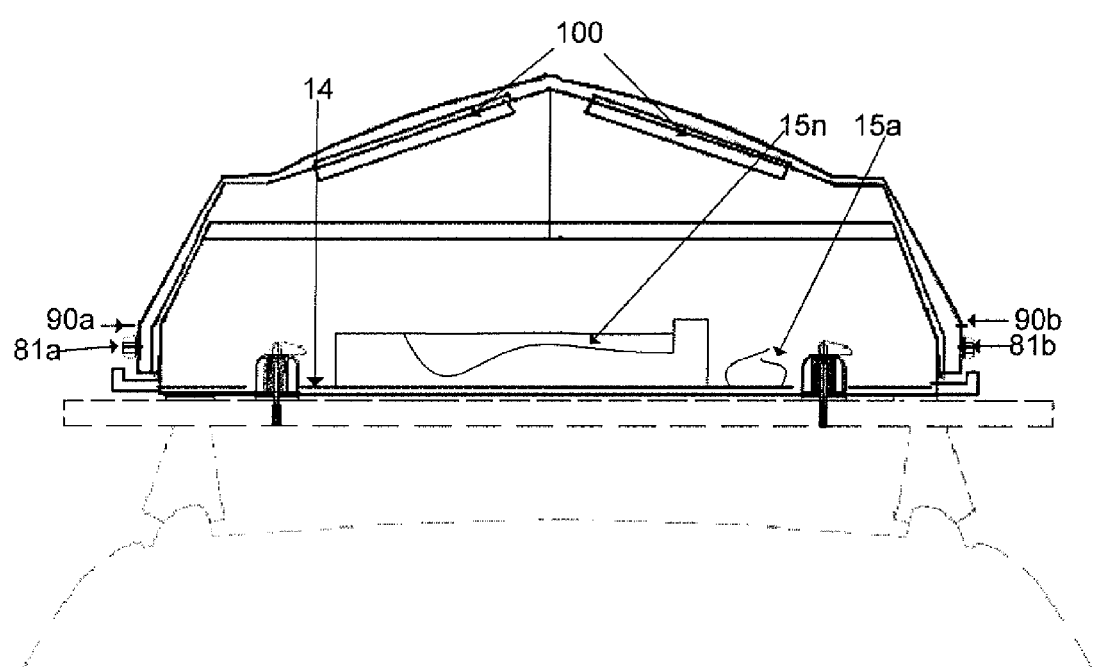
FIG. 5 is a see through view of an embodiment of the present invention attached to a vehicle from the rear of the vehicle.

In an embodiment, the base comprises a pad 14 (FIG. 5). The pad is thin or thick and made from any material that prevents or decreases objects placed in the container from sliding when the vehicle is in motion. In an embodiment, the container comprises means to tie down objects 15a-n in the container, such as but not limited to hooks and cords, netting, and the like. In an embodiment, the pad is a material that releasably attaches hook and loop fasteners, and hook and loop fasteners are used to toggle objects to the pad. The pad optionally includes openings to allow access to the attachment means. In an embodiment, the pad has indentations to receive sporting equipment, such as oars, a boat motor or engine, fishing gear and the like, so that a user can place objects in the indentations securely. In an embodiment, the pad is a thick foam with cut-outs shaped like sporting equipment. Lighter objects, such as camping gear, food, clothing, nets, etc., can be loaded on top of the pad with indentations. The pad includes openings for the attachment means 60.

The boat fits over the storage part and is releasably attached to the storage part at securing means 80 at exterior walls 12 a, b. As shown in FIG. 4, the boat is attached to the storage part by at least one securing means 80 a-n. In an embodiment, the boat is attached by at least two securing means. In an embodiment, the boat is attached to the container by four or more securing means. In this embodiment, at least two securing means 80 a, b, are spaced apart from each other on each side wall, 12 a, b of the container.

Figure 9:
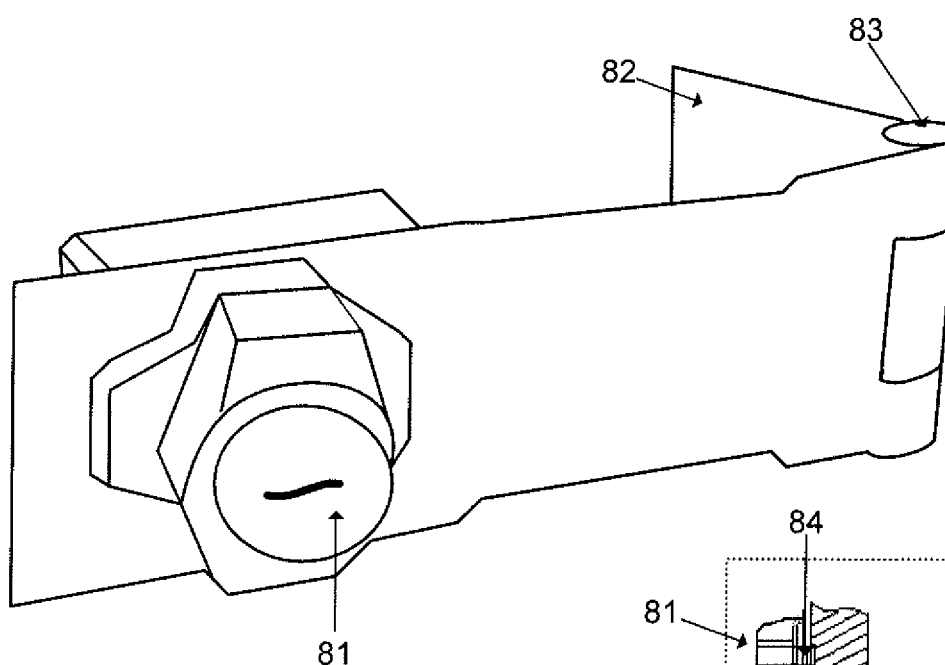
FIGS. 9 and 10 depict examples of the securing means.
Figure 10:
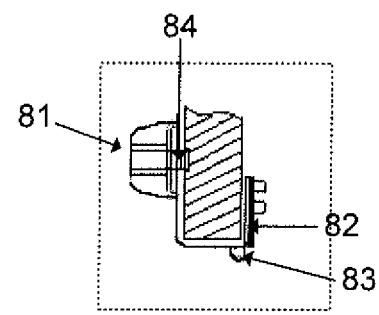
Figure 11:
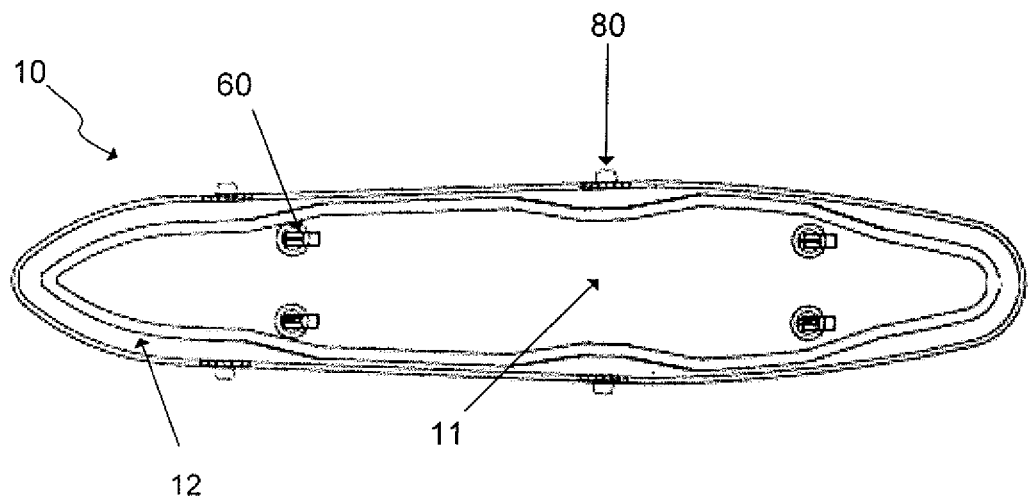
FIG. 11 is a top view of an embodiment showing a container for a kayak.
Figure 12:
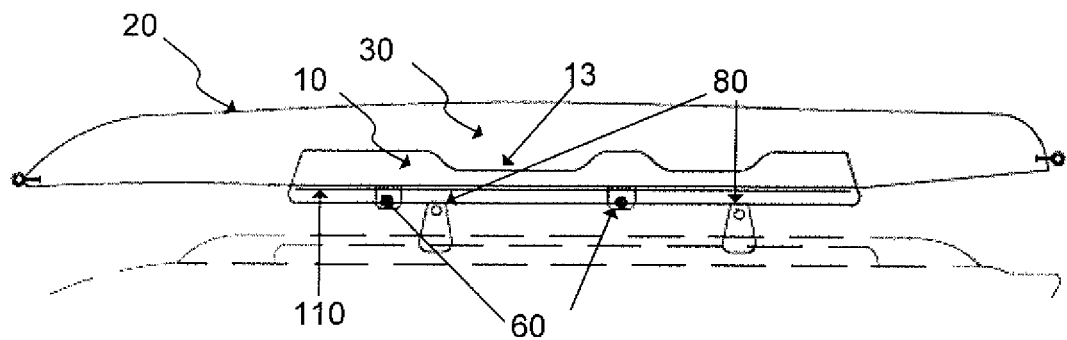
FIG. 12 is a side see-through view of an embodiment of a kayak attached to a container on a typical vehicle.

In an embodiment (best seen in FIGS. 9 and 10), the securing means is a locking hasp wherein a hasp 81 corresponding to a locking portion 84 at exterior walls of the boat, is attached to a side wall of the container with a hinged mounting plate 82. When the lock is opened and the boat released, the hasp drops by action of the hinge 83, and the boat may be lifted off of the container. The securing means remains attached to the side wall 12 a,b of the container. To secure the boat on the container part, the boat is placed upside down on the container such that the bow is toward the front of the container. The securing means 80 a-n are raised to align with the lock portion on the boat 84, and secured, typically with a key, but any securing means may be used. In an embodiment, the lip of the top of the boat rests on the flange and the boat is not attached to the storage device. When lifted at an angle on one side, the boats lip engages the flange and the rim of the other side to stop the boat from slipping off of the vehicle.

Figure 6:
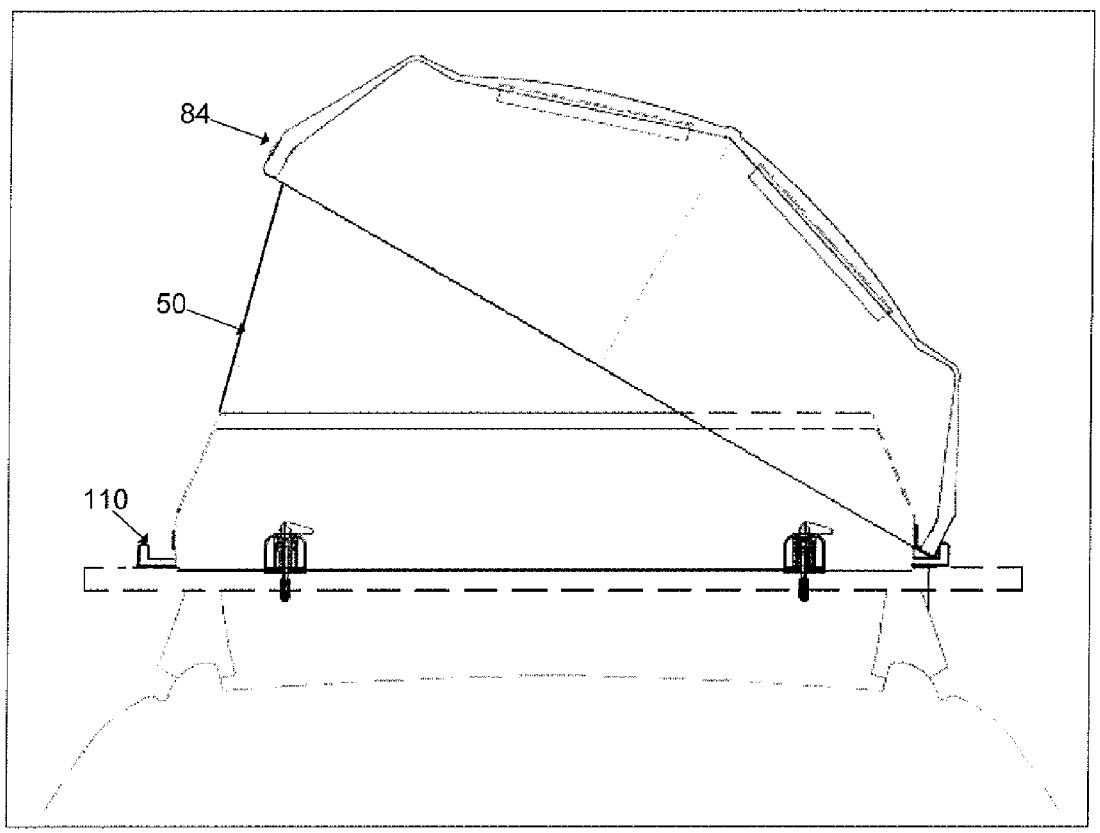
FIG. 6 is a see through view of an embodiment of the present invention attached to a vehicle with the boat raised on one side of the storage part.
Figure 13:
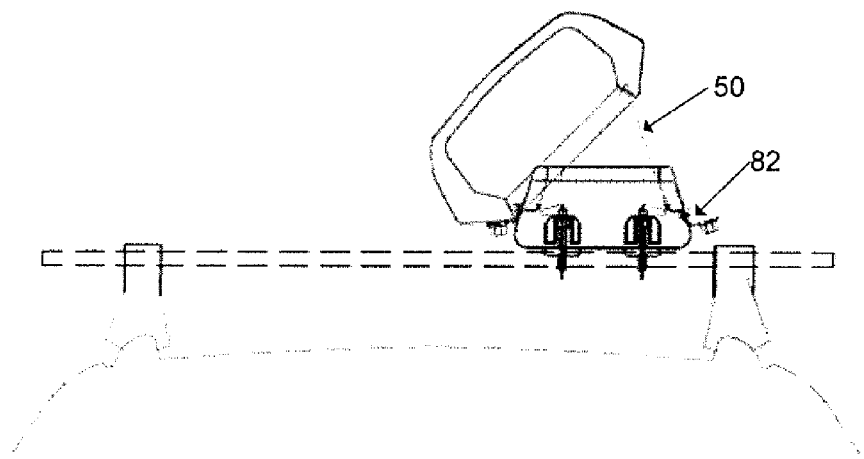
FIG. 13 is a rear see through view of an embodiment with one side of the kayak released from the storage part.
Figure 14:
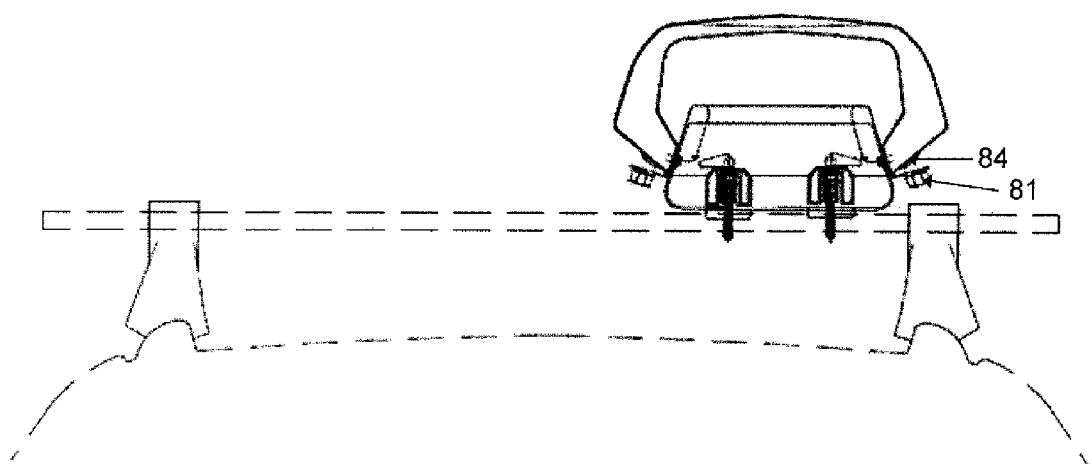
FIG. 14 is a rear see-through view of an embodiment showing a kayak attached to a container attached to a rack of a vehicle with the securing attachments open.
Figure 15:
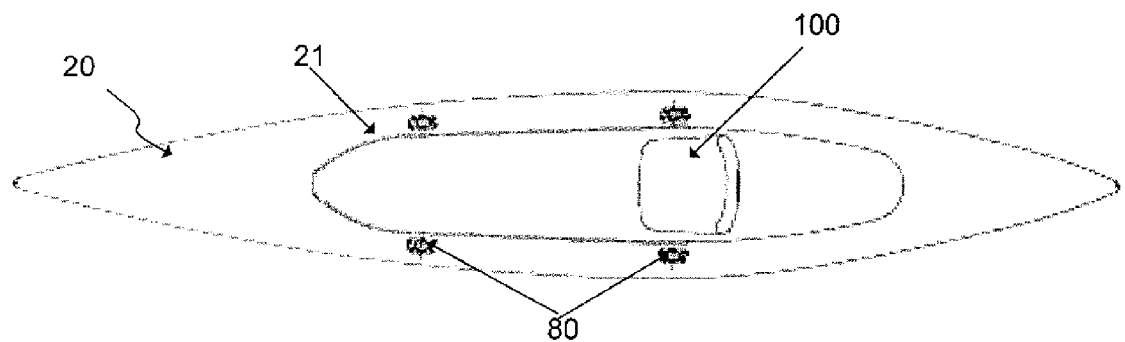
FIG. 15 is a top view of an alternate embodiment showing a kayak.

Alternatively, one side of the securing means is unlocked, the hinges 83 of the securing means allow the boat to be raised on one side by detaching one side and keeping the other side attached. As shown in FIG. 6 and FIG. 13, the boat portion may be held in an open position for access to the container. In an embodiment, the invention comprises an arm 50 to prop the boat open after a side of the boat is raised.

In an embodiment, the container comprises a cover (not shown). The cover is intended for use when the boat has been removed to protect any items remaining in the container. The cover is formed from a tear-resistant, waterproof or water resistant flexible material shaped or fitted to securely cover the container when the boat is removed. Flexible materials include, but are not limited to polymers, rubbers, fabrics, papers, including laminates and bonded layers thereof, and the like. In an embodiment, the cover conforms to the exterior walls of the container with a top that covers the opening. In an embodiment, the cover is flat across the opening. In an embodiment, the cover conforms to the bottom of the interior hull of the boat. In an embodiment, the cover is formed from a light weight waterproof material, such as the material sold by W. L. Gore and Associates, Inc. under the registered trade name GORE-TEX. In an embodiment, the cover is made from a canvas that is waterproof or water resistant. The cover is attached to the container using grommets, attachment means that correspond to the hasps, or by using an elastic edge that extends under the base and holds the cover firmly over the container.

The boat is relatively small and preferably weighs less than 100 pounds. The boat is formed from any lightweight, rigid, durable material, such as metals, polymers, fiberglass, resins, compounds and composites thereof, and the like. The boat may be single or double hulled and may have material between the inner and outer hull. The boat may be motor or engine driven and includes means to mount an engine or motor. The boat of the present invention is formed with an exterior surface element 90, such as an indentation or handle, to make it easy to lift the boat off of the storage device. The handles may then be used to attach bumpers or other gear to the outside of the boat. The exterior surface element may incorporate the securing means 80 that correspond to portions of the storage device designed to accept the securing means.

Seating for the boat or kayak is included. In an embodiment, benches 100 are stored on the inside of the bottom of the boat during transport. The benches snap into supports on the inside side wall of the boat to provide seating in the boat during use. A seat for the kayak may be in place with a fold-down back, or may be assembled similar to the bench. The benches/seats are formed from a similar material as that used to make the boat, or from any lightweight durable material.

Figure 16:
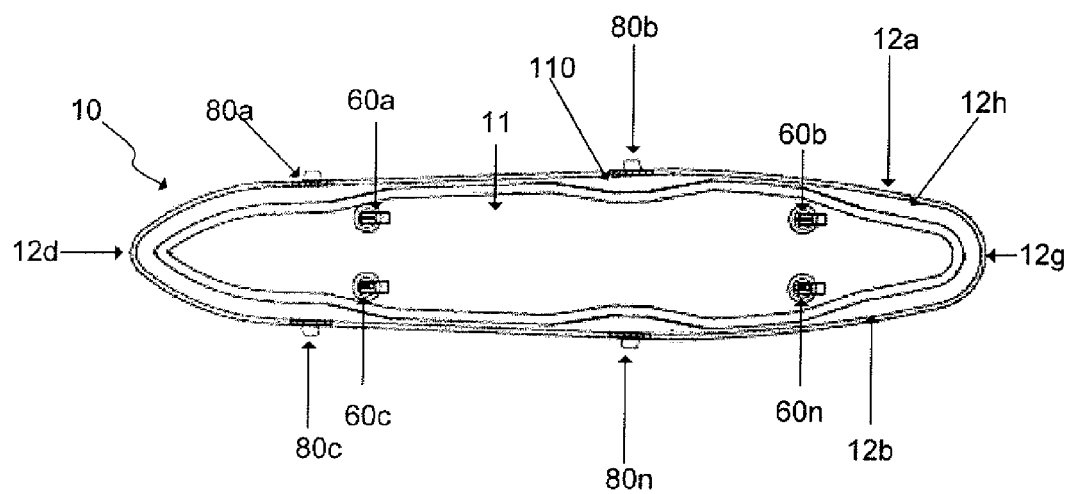
FIG. 16 is a top view of an alternate embodiment of the storage part showing attachment means to the racks and the secure attachments for the kayak.
Figure 17:
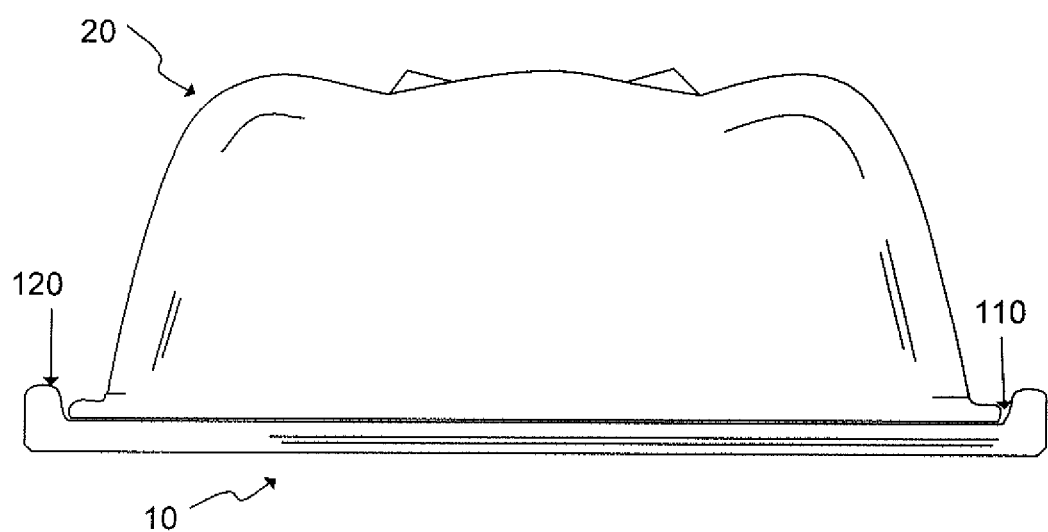
FIG. 17 is a back side view of the boat attached to the storage device showing the flange and the rim.

FIGS. 11-16 depict an embodiment for a kayak. As shown in FIG. 16, the storage device may include a flange 110 to accept the outer edge of kayak. The flange may include a weather strip to seal the contents of the container.

The foregoing descriptions of specific embodiments and examples of the present invention have been presented for purposes of illustration and description. They are not intended to be exhaustive or to limit the invention to the precise forms disclosed, and obviously many modifications and variations are possible in light of the above teachings. It will be understood that the invention is intended to cover alternatives, modifications and equivalents. The embodiments were chosen and described in order to best explain the principles of the invention and its practical application, to thereby enable others skilled in the art to best utilize the invention and various embodiments with various modifications as are suited to the particular use contemplated. It is therefore to be understood that within the scope of the appended claims, the invention may be practiced otherwise than as specifically described herein.

I claim:

1. An apparatus attachable to a vehicle roof rack comprising a storage device and a removable boat which forms a cover for the storage device comprising:

a base comprising at least two side walls, each side wall having a flange, the base planar and generally conforming to a gunwale of the boat, the walls attached to the base, extending upward and conforming generally to interior walls of the boat to form an open container, the flanges extending outward from each of the walls at the base, each flange comprising a rim, each rim extending upward from each flange at an outer portion of the flange and extending the length of each side wall, each rim having only a vertical component such that the rim does not over-hang the flange and sized such that, when either side of the gunwale of the boat is lifted from the storage device an inside wall of the upward extension of the rim opposite the lifted side gunwale engages an opposite side gunwale of the boat to act as a hinge;

means for releasably attaching the container to the roof rack; and means for securely releasably attaching the boat in an inverted position to the storage device, the boat formed as a single unit, the securing means comprising at least two locking mechanisms, the locking mechanisms attaching a portion of the first side gunwale of the boat and the second side of the gunwale of the boat to a portion of a corresponding flange of the storage device such that the boat fits over the container to create a water-tight volume from the container base to the inside bottom of the boat, and, when the locks are opened, the boat is released, the securing means remains attached to the storage device, and the boat may be lifted off of the storage device.

2. The apparatus of claim 1 wherein the walls of the container comprise access means.

3. The apparatus of claim 2 wherein the access means is one of a segment of the side wall that is lower than the remainder of the wall, a door, a sliding panel, a removable segment, and a hinged segment.

4. The apparatus of claim 1 wherein the storage device further comprises a stern wall, and opposite ends of the stern wall are attached to each side wall at a stern end.

5. The apparatus of claim 1 comprising a pad, the pad shaped to cover the base.

6. The apparatus of claim 5 wherein the pad comprises means to tie down objects placed in the container.

7. The apparatus of claim 6 wherein the tie down means includes hooks, cords, netting, hook and loop fasteners, and indentations.

8. The apparatus of claim 7 wherein the indentations are shaped to receive at least one of a part for the boat, an accessory for the boat, sporting equipment and camping gear.

9. The apparatus of claim 1 comprising a cover for the container for use when the boat is removed.

10. The apparatus of claim 1 wherein the boat weighs less than 100 pounds.

11. The apparatus of claim 1 wherein the boat comprises at least one removeably detachable bench.

12. The apparatus of claim 1 wherein the boat is double hulled.

13. The apparatus of claim 1 wherein the boat comprises at least one handle.

14. The apparatus of claim 1 wherein the apparatus is formed from a polymer.

* * * * *